Patented Jan. 4, 1949

2,458,266

UNITED STATES PATENT OFFICE 2,458,266

PROCESS FOR MAKING ETHYLENE OXIDE

Rudolph L. Heider and Carlyle J. Stehman, Dayton, Ohio, assignors to Monsanto Chemical Company, St. Louis, Mo., a corporation of Delaware No Drawing. Application February 9, 1945, Serial No. 577,153

13 Claims. (Cl. 260—348.5)

This invention relates to the manufacture of ethylene oxide and more particularly to the process of producing ethylene oxide by the catalytic oxidation of ethylene upon silver catalysts.

The catalytic oxidation of ethylene for the production of ethylene oxide has been widely investigated, and it has been found that while silver or silver oxide is a catalyst for the reaction, the efficiency of the oxidation is determined largely by the nature of the catalyst carrier upon which the silver is supported. Catalyst carriers employed in the prior art include pumice, carbon, silica, zeolite, kieselguhr, Alundum, corundum, etc. Some of these carriers, for example, zeolite, give only very low conversions per pass. Others, for example, silica gel, tend to develop hot spots during the reaction and are consequently short-lived. Alundum and corundum in combination with silver give good conversions to ethylene oxide and are long-lived, but their high activity requires the use of very low concentrations of ethylene in the gas mixture which is subjected to these catalysts; thus, while the conversions obtained with these catalysts are good, throughput is low.

With none of the prior catalyst carriers, in combination with silver, has it been found possible to employ crude gas mixtures, for example, a mixture of hydrocarbon gases such as are produced by many petroleum cracking operations, containing ethylene, other gaseous olefins, and gaseous parafins, for the production of ethylene oxide by the catalytic oxidation of the ethylene contained in such gas mixtures. Thus, while Lenher in U. S. Patent No. 1,995,991 suggests that he may oxidize a mixture of hydrocarbons, or a gas containing an olefin hydrocarbon (p. 3, col. 2, lines 61-3), the process employed by him is non-catalytic and results in the production of more aldehyde than ethylene oxide. We have found that when a mixture of paraffinic hydrocarbons containing ethylene and air is passed over catalysts which were known to give good conversions of pure ethylene to ethylene oxide, there occurs so rapid an oxidation of the paraffinic constituents of the mixture that overheating of the catalysts, resulting in deterioration of the same, always takes place. Since the use of gaseous hydrocarbon mixtures containing paraffinic hydrocarbons rather than of pure ethylene, would obviate the necessity of purifying the ethylene previous to the oxidation step, the production of ethylene oxide from gaseous hydrocarbon mixtures has long been desired.

Accordingly, an object of the invention is the production of ethylene oxide by catalytic oxidation of gaseous hydrocarbon mixtures containing methane and ethane as well as ethylene. Another object of the invention is the production of ethylene oxide in good yields and with a commercially feasible throughput. Still another object of the invention is the provision of a silver bearing catalytic material which includes a carrier composed of silica particles and alpha alumina particles suitable for the catalytic oxidation of ethylene to ethylene oxide.

These and other objects which will be hereinafter described are provided by the following invention wherein oxidation of either pure ethylene or mixtures of ethylene with paraffinic hydrocarbons such as methane and ethane is effected in the presence of a catalyst comprising silver supported upon a carrier consisting of silica and a certain specific amount alpha-aluminum oxide. The silica carrier may be any form of silica with the exception of silica gel and preferably we employ a bonded type of silica particle, that is, a material in which the particles consist of aggregates of smaller silica particles which have been bonded together by thermal sintering in which process small amounts of binding agents may be employed. A suitable material comprises alpha-quartz to the extent of 90% or more, together with which may be associated alpha-tridymite and which may also contain traces of alpha-cristobalite. A commerically available material of this latter type is a bonded silica filter stone well known in the trade.

The aluminum oxide which we employ is an alumina which has been converted by heat treatment at a high temperature to the form of alpha-alumina. It is a crystalline variety of alumina which may have been fused in the course of preparation. We specifically exclude activated alumina, that is, alumina in the "gamma" form, since such materials having been formed from aluminum hydroxide are so active that they promote the oxidation of ethylene to carbon dioxide and water rather than to ethylene oxide. The term "alpha-aluminum oxide" or "alpha-alumina" is intended to cover the crystalline aluminum oxide which has been heated to a temperature of 800° C. to 1000° C. or even to fusion temperature. Commercially available alpha-aluminum oxide may be employed. The alumina should be in the finely divided form, that is, it should have a size which will pass through a screen having a fineness of at least 100 or 150 meshes to the inch.

Silver oxide is used in the preparation of the catalyst in order to supply the primary catalytic material. It is used in the form of the commercial variety which has a purity equivalent to that prescribed in the U. S. Pharmacopeia IX. The catalyst as prepared and ready for use in the reactor contains the silver oxide coated upon the particles of the carrier. However, due to the temperature prevailing in the catalyst chamber during use the silver oxide is thermally decomposed forming the active constituent of the catalyst which is silver.

In the present application the term "carrier" is used to designate the total silica and alumina present excluding the silver bearing material, and the term "catalyst" is used to designate the composition including the carrier in combination with the silver bearing material which may be silver and/or silver oxide. By distinguishing between the carrier and the catalyst, applicants do not wish to imply that silver alone is responsible for the improved results obtained, or that the action of the silver may in any way be divorced from the action of the carrier. The action of the silver oxide or the silver resulting from the reduction thereof is in some manner, not completely understood, modified by the carrier upon which it is deposited so that the catalytic action obtained by applicants in the present invention is the resultant effect of the combination of the silver bearing material and the carrier.

In preparing the catalyst we prefer to operate substantially as follows: The silica particles, produced by crushing silica filter stone, a quantity of silver oxide, together with a minor quantity of the finely divided alpha-alumina, is slurried in water and the resulting mixture is evaporated over a low flame almost to dryness and is then further dried in an oven at a temperature of from 50° C. to 100° C., and preferably at 75° C. to 85° C. and finally screened to remove fines and non-adhering silver oxide and alumina. The quantity of silver oxide which we employ may be greatly varied, i. e., from say 10% by weight to 50% and even 60% to 70% by weight of the carrier. For best results we prefer to employ as much of the silver oxide as will be retained by the mixture of silica and alumina, and this amount generally ranges from about 45% to 55% by weight of the carrier, depending upon the mixing and drying conditions. The quantity of alumina which we employ is a minor proportion of the silica. We have found that improved results are obtained when employing from, say, 2% to 15% and somewhat better results are obtained by employing from 5% to 10% of the alpha-alumina, based on the weight of the carrier.

As the quantity of alumina associated with the silica becomes greater than 15% by weight of the carrier (silica plus alumina) a preferential oxidation of any paraffinic constituents present in the said gas takes place, causing a rapid temperature rise of the catalytic material during use. The high temperature results in a rapid deterioration of the catalyst which is manifested by a decreasing conversion of ethylene to ethylene oxide. A similar effect is noticeable when oxidizing pure ethylene (i. e. ethylene free of paraffinic constitutents) due apparently to the excessive reactivity of the silica-alumina combination, when more than 15% by weight of the alumina is present therein.

The catalyst obtained by following the procedure given above is a strong, porous mass of particles through which a uniform stream of gas may be passed. When employed for the oxidation of ethylene or gaseous hydrocarbon mixtures containing the same, from 40% to 50% of the ethylene supplied to the reactor is converted to ethylene oxide, and the catalyst remains substantially unaffected when using a concentration of from 3% to 5% or more of ethylene in the feed gas, either in the presence or absence of other gaseous hydrocarbons. This is surprising when it is realized that silver oxide on a bonded silica such as filterstone particles, in the absence of alpha-alumina, develops hot spots under the same conditions so that the results obtained are rarely reproducible without the employment of repressants such as organic halides.

When using our silver-silica-alumina catalyst, oxidation of ethylene, either in the presence or absence of other gaseous hydrocarbons, may be carried out at temperatures of from 225° C. to 350° C. and preferably at temperatures of from 250° C. to 300° C. The oxidizing medium may be air, or a mixture of oxygen and an inert gas. Oxidation may be economically carried out by a single pass operation, although, if desired, recycling of the exit gases (from which the ethylene oxide has been removed by absorption) may be used by constant addition of ethylene and air to the feed gases. Employing the present catalyst, from 70% to 80% of the ethylene originally present in the feed gas is consumed in one pass, from 40% to 50% being converted to ethylene oxide and the remainder to other oxidation products, chiefly carbon dioxide. Thus, after absorption of the ethylene oxide, the exit gas is a mixture which generally contains less than 1% of ethylene, the major proportion of said exit gas being carbon dioxide, oxygen and nitrogen. In a specific instance, for example, employing an initial gas mixture consisting of 3% by volume of ethylene and 97% by volume of air, 45% of the ethylene is converted into ethylene oxide and 30% into carbon dioxide. The composition of the gaseous product after a single pass is approximately as follows:

| | Volume, per cent |
|---|---|
| Carbon dioxide | 1.8 |
| Ethylene | 0.8 |
| Ethylene oxide | 1.4 |
| Water | 1.8 |
| Oxygen | 16.9 |
| Nitrogen | 77.3 |

Thus, after removal of the ethylene oxide, the quantity of nitrogen present in a gas mixture containing only 0.8% of ethylene is substantially that which was present in the initial 3% ethylene-97% air mixture. To recycle so lean a gas is generally uneconomical, owing to the fact that the ethylene oxide so produced is obtained in a concentration which cannot be readily recovered by absorption processes; concentrations of, say, less than 0.5% of ethylene oxide are economically recovered only by conversion to ethylene glycol. The recovery by the usual methods of the ethylene contained in the off-gases presents so many difficulties as to be economically unfeasible. Hence in the present process, employing the catalyst described herein and a concentration of from 3% to 10% of ethylene in the feed gas, a single pass operation is preferred to a recycling system. An alternative procedure which may be employed when using a comparatively expensive ethylene comprises a multiple pass operation wherein there is employed a series of separate catalyst chambers, the ethylene oxide being absorbed after each oxidation and an additional quantity of ethylene being added to the off-gas before it is passed into the next catalyst chamber. In this way, by passage through a series of three reactors, utilization of the ethylene present in the off-gas is effected to the extent of from 50% to 60%. The advisability of this alternative procedure obviously depends upon the cost of the multiple reactors as compared to the value of the ethylene thereby recovered.

While we may employ any type of chamber customarily employed for reactions in the gaseous phase, we preferably use a stainless steel tube of sufficient proportions to allow a space velocity of from, say, 500 to 700 reciprocal hours to be attained. By the term "space velocity" we mean the number of volumes of gas measured at standard conditions (0° C./760 mm.) per hour passing over a unit volume of catalyst. We have found, however, that aside from the economic consideration of throughput, space velocity can be considerably varied, depending upon other factors entering into the operation, i. e., reaction temperature, concentration of ethylene and air in the gas mixture, proportion of alumina used in the catalyst, etc. Generally, the space velocity required for good conversions to ethylene oxide varies from, say, 160 to 1000 reciprocal hours. While ordinarily a space velocity of less than 1000 reciprocal hours will be employed, this value may be varied, particularly if a recycle system is contemplated.

The reaction is generally carried out at atmospheric pressure, although pressure either above or below atmospheric pressure may also be employed.

Recovery of the ethylene oxide may be effected by any of the methods known to the art, i. e., by absorption upon activated carbon, or by solution in water, etc. Preferably we pass the reaction gases through a scrubbing tower, wherein the ethylene oxide containing gases are thoroughly contacted with water and the ethylene oxide dissolved therein.

The invention is further illustrated, but not limited, by the following examples:

*Example 1*

A mixture consisting of 120 g. of 4 to 8 mesh washed silica particles, 60 g. of silver oxide (U. S. Pharmacoepia IX), 6 g. of finely ground alpha-alumina and 100 ml. of distilled water was thoroughly mixed together and then heated, with stirring, in an evaporating dish to the consistency of a thick paste. The product was then placed in an oven which was maintained at a temperature of about 80° C. and dried completely. The resulting mass of loose particles was then screened upon a 10 mesh screen to remove non-adhering silver oxide and was then ready for use.

The catalyst particles were introduced to a depth of approximately 1 ft., into the central portion of a stainless steel tube having an internal diameter of 1 inch and a length of 3 feet. The unpacked portion of the inlet end of the tube served as a preheating chamber for the incoming gas. The preheating section and the reaction space were maintained at a constant temperature of about 244° C. by immersion in a bath of molten salts.

A gas mixture consisting of 90% ethylene, 0.2% acetylene, 0.2% propylene, 3.6% methane and 6.0% ethane was diluted with air so as to make the ethylene concentration 2.9% to 3.0% by volume in the mixture. This was then passed through the heated reactor at a rate corresponding to 2.25 liters of ethylene and 65.0 liters of air per hour, to give a space velocity of 670 reciprocal hours. The gases leaving the catalyst tube were led through a tower where they were scrubbed with water for absorption of the ethylene oxide formed. During the first 24 hours of the run, the temperature of the catalyst bed rose to 270° C. and a sample of the product, taken about 25 hours after passage of the hydrocarbon-air mixture had been initiated, showed a 36.4% conversion of ethylene to ethylene oxide. At the end of 31 hours, the per cent conversion to ethylene oxide was 40.3%. At the end of 49 hours, at which time the temperature of the catalyst bed was 276° C., the per cent conversion of ethylene to ethylene oxide was 43%. At the end of 72 hours of continuous operation the per cent conversion remained substantially the same, being 43.5% of introduced ethylene converted into ethylene oxide.

When attempting to employ a catalyst prepared from silica particles and silver oxide, but in the absence of alpha-alumina, and using the hydrocarbon-air mixture described above, the catalyst developed hot spots within a few hours so that substantially no oxidation to ethylene oxide occurred after about three to four hours. Likewise, a catalyst prepared from silver oxide and Alundum, in the absence of silica, was found to be a poor catalyst for this reaction, favoring the oxidation of the paraffins instead of the olefin and developing thereby over-heated zones which caused erratic and irreproducible results.

*Example 2*

This example ilustrates that the silica-alumina-silver oxide catalyst prepared as described in Example 1, may be employed for long periods of time without a serious decrease in activity. Into the tube reactor, described in Example 1, containing catalyst to the depth of 1 foot and brought to a temperature of about 225° C. there was introduced a gas mixture consisting of 3% of ethylene and 97% of air, by volume. By varying the space velocity during the run from 600 reciprocal hours to 700 reciprocal hours, it was found that best conversions were obtained at a space velocity of from 660 to 690 reciprocal hours. At the end of 75.5 hours, with a catalyst bed temperature of 266° C., an ethylene flow of 2.0 liters per hour and air flow of 65.0 liters per hour, the per cent conversion of introduced ethylene to ethylene oxide was 39%. At the end of 164 hours it was 42.3%. With the same flow rates, at the end of 253.5 hours, or more than ten days after beginning the run, the temperature of the catalyst bed was 271° C., and the per cent conversion of ethylene in the feed gas into ethylene oxide was 42.3%. Another week later, or more than 17 days after the beginning of the experiment, the conversion had risen to 46.3%, and the catalyst bed temperature was 268° C. At the end of three weeks, with the same flow rate, the catalyst bed temperature was 293° C., and a 50.1% conversion was obtained. After the catalyst had been on stream continuously for six weeks, it had undergone substantially no deterioration, since at the end of that period the conversion of ethylene to ethylene oxide was between 42% and 43%.

The high efficiency of the present bonded silica-alumina-silver oxide catalyst is apparent from the comparison with the results obtained in another experiment, made with the use of a silica-silver oxide catalyst. This catalyst, prepared by mixing together 120 g. of 4 x 8 mesh silica particles, 60 g. of silver oxide (U. S. P. IX) and 100 ml. of distilled water, and then drying the slurry as in the production of the catalyst, described in Example 1, was employed with a gas mixture consisting of 3% of ethylene and 97% of air, by volume. The temperature of the bath surrounding the catalyst tube was maintained at about 244° C. During the first 2.5 days the temperature of the catalyst bed rose from 266° C. to 349° C. and the per cent conversion of introduced ethylene into ethylene oxide fell from 38.1% to 26.7%. The ethylene and air flows were 2.0 and 65.0 liters, respectively.

In another test, in which there was used a tabular corundum catalyst containing 10% by weight of silver, a 3% ethylene-97% air mixture at a space velocity of 264 reciprocal hours gave conversions varying from 28.6% to 16.2% at temperatures (catalyst bed) of from 308° C. to 360° C. The use of higher space velocities gave lower conversions; the conversion of introduced ethylene to ethylene oxide at a space velocity of 1100 reciprocal hours and catalyst bed temperatures of from 310° C. to 364° C. varied from 8.8% to 13.9%.

*Example 3*

This example shows the use of 5% ethylene-95% air mixtures with the silica-alumina-silver oxide catalyst described in Example 1. Into the tube reactor described in Example 1, containing the catalyst to the depth of 1 foot and brought to a temperature of about 244° C. there was introduced a gas mixture consisting of 5% of ethylene and 95% of air, by volume, employing an ethylene flow of 3.25 liters per hour and an air flow of 65.0 liters per hour, at a space velocity of 683 reciprocal hours. At the end of 24 hours, 35.4% of the ethylene was converted into ethylene oxide, while at the end of 48 hours the conversion was 40.1%.

Using the silica-silver oxide catalyst described in Example 2, the use of a 5% ethylene-95% air mixture in the same reactor at the same ethylene and air flow, a space velocity of 683 reciprocal hours and an initial catalyst bed temperature of 245° C. gave a 26.9% conversion of ethylene into ethylene oxide at the end of 24 hours, and at the end of 30.5 hours the catalyst developed a hot spot which could not be cooled, so that the test had to be discontinued after an onstream time of only 31.5 hours.

Illustrative of the invention and employing the methods already described, satisfactory carriers and catalysts have been prepared having the following compositions:

|  | Carrier Composition, per cent by Weight | | | | |
| --- | --- | --- | --- | --- | --- |
|  | 1 | 2 | 3 | 4 | 5 |
| Silica (quartz) | 98 | 95 | 90 | 87.5 | 85 |
| alpha-Alumina | 2 | 5 | 10 | 12.5 | 15 |

|  | Catalyst Composition, per cent by Weight | | | | |
| --- | --- | --- | --- | --- | --- |
|  | 6 | 7 | 8 | 9 | 10 |
| Carrier | 58.5 | 67.8 | 70 | 60 | 65 |
| Silver oxide (Ag₂O) | 41.5 | 32.2 | 30 | 40 | 35 |

While the composition of the carrier is limited closely to the ranges of silica and alumina herein specified, the composition of the catalyst, that is, the silver oxide combination with the carrier, is susceptible of wide variation in compositon, by reason of the fact that the catalytic influence of the carrier is obtainable with varying proportions of silver resulting from the reduction of silver oxide.

For most purposes the most desirable size of the silica particles employed will be found in the range of from 4 to 8 mesh screen size. This size may, however, be varied over a considerable range depending upon the space velocity at which it is desired to operate the catalyst.

As many widely different embodiments of this invention may be made without departing from the spirit thereof, it is to be understood that we do not limit ourselves to the specific embodiments thereof except as defined in the appended claims.

What we claim is:

1. The process for making ethylene oxide by the direct chemical combination of ethylene and oxygen on a silver catalyst, which comprises passing ethylene and oxygen-containing gases at temperatures between 225° C. and 350° C. over a silver catalyst supported upon a carrier consisting essentially of a mixture of crystalline alpha silica and alpha-alumina, the alumina comprising from 2% to 15% by weight of said carrier.

2. The process for making ethylene oxide by the direct chemical combination of ethylene and oxygen on a silver catalyst, which comprises passing ethylene, together with normally gaseous paraffinic hydrocarbons and oxygen, at temperatures between 225° C. and 350° C. over a silver catalyst supported upon a carrier consisting essentially of a mixture of crystalline alpha silica and alpha-alumina, the alumina comprising from 2% to 15% by weight of said carrier.

3. The process for making ethylene oxide by the direct chemical combination of ethylene and oxygen on a silver catalyst, which comprises passing ethylene and air at temperatures between 250° C. and 300° C. over a silver catalyst supported upon a carrier consisting essentially of a mixture of crystalline alpha silica and alpha-alumina, the alumina comprising from 2% to 15% by weight of said carrier.

4. The process for making ethylene oxide by the direct chemical combination of ethylene and oxygen on a silver catalyst, which comprises passing ethylene together with normally gaseous paraffinic hydrocarbons and oxygen containing gases at temperatures between 225° C. and 300° C. over a silver catalyst supported upon a carrier consisting essentially of a mixture of crystalline alpha silica and alpha-alumina, the alumina comprising from 2% to 15% by weight of said carrier.

5. The process for making ethylene oxide by the direct chemical combination of ethylene and oxygen on a silver catalyst, which comprises passing ethylene and oxygen containing gases at temperatures between 225° C. and 350° C. over a silver catalyst supported upon a carrier consisting of a mixture of crystalline alpha silica and alpha-alumina, the alumina comprising from 5% to 10% by weight of said carrier.

6. In the process for making ethylene oxide by the catalytic oxidation of ethylene on a silver catalyst, the step of passing a gaseous mixture of ethylene and oxygen over a silver catalyst supported upon a carrier composed of alpha-quartz particles and alpha-alumina particles, said alumina being 5% to 10% by weight of said carrier.

7. A catalytic material suitable for the catalytic oxidation of ethylene to ethylene oxide which consists of silver oxide upon a carrier composed of alpha quartz particles associated with alpha-alumina particles, the alumina being within the range of 2% to 15% by weight of said carrier.

8. A catalytic material suitable for the catalytic oxidation of ethylene to ethylene oxide which consists of silver oxide upon a carrier composed of alpha quartz particles associated with alpha-alumina particles, the alumina being within the range of 5% to 10% by weight of said carrier.

9. The process for making ethylene oxide by the direct chemical combination of ethylene and oxygen on a silver catalyst, which comprises passing ethylene, together with normally gaseous paraffinic hydrocarbons and oxygen, at temperatures between 225° C. and 350° C. over a silver catalyst supported upon a carrier consisting essentially of a mixture of crystalline alpha silica and alpha-alumina, the alumina comprising from 2% to 15% by weight of said carrier.

10. The process of making ethylene oxide by the direct chemical combination of ethylene and oxygen on a silver catalyst, which comprises passing ethylene together with normally gaseous paraffinic hydrocarbons and air at temperatures between 225° C. and 300° C. over a silver catalyst supported upon a carrier consisting essentially of a mixture of crystalline alpha silica and alpha-alumina, the alumina comprising from 2% to 15% by weight of said carrier.

11. The process for making ethylene oxide by the direct chemical combination of ethylene and oxygen on a silver catalyst, which comprises passing ethylene and oxygen containing gases at temperatures between 225° C. and 350° C. over a silver catalyst supported upon a carrier consisting of a mixture of crystalline alpha silica and alpha-alumina, the alumina comprising from 5% to 10% by weight of said carrier.

12. A catalytic material suitable for the catalytic oxidation of ethylene to ethylene oxide which consists essentially of an active catalytic material of the group consisting of silver oxide, silver, and mixtures thereof, upon a carrier composed of crystalline alpha-silica particles and alpha-alumina, the alumina being from 2% to 15% by weight of said carrier.

13. A catalytic material suitable for the catalytic oxidation of ethylene to ethylene oxide which consists essentially of an active catalytic material of the group consisting of silver oxide, silver, and mixtures thereof, upon a carrier composed of crystalline alpha-silica particles and alpha-alumina, the alumina being from 5% to 10% by weight of said carrier.

RUDOLPH L. HEIDER.
CARLYLE J. STEHMAN.

REFERENCES CITED

The following references are of record in the file of this patent:

UNITED STATES PATENTS

| Number | Name | Date |
| --- | --- | --- |
| 1,933,091 | Bertsch | Oct. 31, 1933 |
| 2,125,333 | Carter | Aug. 2, 1938 |
| 2,142,948 | Lau | Jan. 3, 1939 |
| 2,194,602 | Lau | Mar. 26, 1940 |
| 2,209,908 | Weiss | July 30, 1940 |
| 2,238,474 | McNamee et al. | Apr. 15, 1941 |
| 2,279,469 | Law et al. | Apr. 14, 1942 |
| 2,294,383 | Carter | Sept. 1, 1942 |
| 2,300,106 | Connolly | Oct. 27, 1942 |
| 2,337,421 | Spence et al. | Dec. 21, 1943 |
| 2,343,731 | Bailie et al. | Mar. 7, 1944 |

FOREIGN PATENTS

| Number | Country | Date |
| --- | --- | --- |
| 558,776 | Great Britain | 1944 |